(12) United States Patent
van der Linde (10) Patent No.: US 9,303,420 B2
(45) Date of Patent: Apr. 5, 2016

(54) PORT-A-POD-Y PORTABLE RESTROOM SYSTEM

(71) Applicant: Peter van der Linde, Charlottesville, VA (US)

(72) Inventor: Peter van der Linde, Charlottesville, VA (US)

(*) Notice: Subject to any disclaimer, the term of this patent is extended or adjusted under 35 U.S.C. 154(b) by 336 days.

(21) Appl. No.: 13/833,261

(22) Filed: Mar. 15, 2013

(65) Prior Publication Data

US 2014/0259353 A1  Sep. 18, 2014

(51) Int. Cl.
*A47K 11/02* (2006.01)
*A47K 4/00* (2006.01)
*E04H 1/12* (2006.01)

(52) U.S. Cl.
CPC .............. *E04H 1/1216* (2013.01); *A47K 11/02* (2013.01); *Y10T 29/49826* (2015.01)

(58) Field of Classification Search
CPC ...... B60R 15/00; B60R 15/04; E04H 1/1216; A47K 4/00; E03D 7/00; E03D 13/00; B62D 29/04
USPC ................... 4/111.1, 300, 321, 340–342, 449, 4/458–461, 474, 475, 479, 483, 663–665, 4/900; 52/143, 219, 220.1–220.8, 243, 52/34, 79.1, 79.12, 79.7
See application file for complete search history.

(56) References Cited

U.S. PATENT DOCUMENTS

| | | | | |
|---|---|---|---|---|
| 445,513 A * | 1/1891 | Powell | .................... | A47K 11/02 217/57 |
| 534,062 A * | 2/1895 | Clifford | .................... | E03D 1/00 4/240 |
| 534,662 A * | 2/1895 | Clifford | .................... | 191/25 |
| 732,342 A * | 6/1903 | Donavin | ................ | A47K 11/02 4/460 |
| 743,834 A * | 11/1903 | Danner | .................. | A47K 11/02 4/111.1 |
| 1,012,907 A * | 12/1911 | Peterson | ................ | A47K 11/02 4/460 |
| 2,410,092 A * | 10/1946 | Martin | ................... | A47K 11/02 4/460 |
| 2,712,164 A | 7/1955 | Sheffield | | |
| 2,772,420 A * | 12/1956 | Carter | ................................ | 4/342 |
| 2,817,091 A * | 12/1957 | Painter | .............................. | 4/664 |
| 2,817,846 A * | 12/1957 | Stift | ........................ | B60R 15/00 296/24.3 |
| 3,162,863 A | 12/1964 | Wokas | | |
| 3,601,821 A | 8/1971 | Corsiglia | | |
| 3,629,874 A * | 12/1971 | Beller | ............................... | 4/462 |
| 3,668,710 A * | 6/1972 | Dowd | .............................. | 4/597 |
| 3,690,077 A | 9/1972 | Dalgliesh, Jr. et al. | | |

(Continued)

FOREIGN PATENT DOCUMENTS

AU   751102   8/2002
CN   1986987   6/2007

(Continued)

OTHER PUBLICATIONS

"Saniplex Economy Restroom Trailer". Mr.John. Available Oct. 16, 2011. Accessed Mar. 13, 2015. http://www.mrjohn.com/TrailerFacilities/SaniplexEconomyRestroom.aspx.*

(Continued)

*Primary Examiner* — Kevin P Shaver
*Assistant Examiner* — Nicholas Ros
(74) *Attorney, Agent, or Firm* — Andrew M. Calderon; Andrew D. Wright; Roberts Mlotkowski Safran & Cole, P.C.

(57) ABSTRACT

A portable restroom system that includes: a utilities trunk; a waste water holding tank; and a plurality of restroom units. The utilities trunk and the waste water holding tank each extend through each one of the plurality of restroom units.

20 Claims, 7 Drawing Sheets

(56) References Cited

U.S. PATENT DOCUMENTS

| | | | |
|---|---|---|---|
| 3,832,811 A * | 9/1974 | Briel, Jr. | E04B 1/3445 52/143 |
| 4,107,795 A | 8/1978 | Carter et al. | |
| 4,348,777 A * | 9/1982 | Peterson | 4/596 |
| 4,653,125 A * | 3/1987 | Porter | 4/301 |
| 5,065,462 A * | 11/1991 | Romano | A47K 4/00 4/604 |
| 5,660,584 A * | 8/1997 | Serrano | 454/108 |
| 6,115,971 A * | 9/2000 | Loebertmann et al. | 52/79.1 |
| 6,615,414 B2 | 9/2003 | Miller et al. | |
| 6,675,540 B1 * | 1/2004 | Rokes | E04B 1/34336 220/1.5 |
| 7,137,156 B2 | 11/2006 | Yang | |
| 7,373,757 B2 | 5/2008 | Hampel | |
| 7,882,577 B2 * | 2/2011 | Merz et al. | 4/663 |
| 2004/0040081 A1 | 3/2004 | Ostbo | |
| 2007/0028375 A1 * | 2/2007 | Marston | E03D 11/11 4/321 |
| 2007/0068094 A1 | 3/2007 | Fralish | |
| 2008/0135506 A1 | 6/2008 | Peters et al. | |
| 2008/0209625 A1 | 9/2008 | Hampel | |
| 2009/0260302 A1 | 10/2009 | Graf | |
| 2012/0102635 A1 | 5/2012 | Cheng | |

FOREIGN PATENT DOCUMENTS

| | | |
|---|---|---|
| EP | 1630307 | 7/2007 |
| WO | 9518273 | 7/1995 |

OTHER PUBLICATIONS

"Sewatoilet Portable Urinal Station". Sewatoilet. Available Nov. 22, 2010. Accessed Mar. 16, 2015. http://sewatoilet.com/products.php?ID=8&action=detail.*

"AMS Global J-Series Restroom Skids". AMS Global. Available 2011. Accessed Sep. 15, 2015. http://www.amsglobal.us/files/AMS_Floor_plan.pdf.*

International Search Report and Written Opinion dated Aug. 5, 2014 in PCT Application No. PCT/US14/28007; 11 pages.

International Preliminary Report on Patentability dated Apr. 23, 2015 in PCT Application No. PCT/US14/28007; 34 pages.

* cited by examiner

PORT-A-POD-Y PORTABLE RESTROOM SYSTEM

FIELD OF THE INVENTION

The present invention generally relates to portable restrooms and, more particularly, to portable structures containing plural restroom units.

BACKGROUND

Portable restrooms, sometimes referred to as port-a-johns, comfort stations, etc., are commonly rented and used for special events such as parties, festivals or concerts, construction sites, and other locations where people gather temporarily. Single unit portable restrooms are common. Multi-unit portable restrooms also exist and are typically permanently installed on trailers with wheels. Such multi-unit portable restrooms are typically equipped with separate vanities, toilets, showers, etc., for each individual unit, in an effort to provide a conventional home-like bathroom on wheels. However, such multi-unit portable restrooms are expensive to procure and maintain since they involve many extra parts such as wheels, wheel bearings, wheel axles, water pumps, etc.

SUMMARY

In a first aspect of the invention, there is a portable restroom system that includes: a utilities trunk; a waste water holding tank; and a plurality of restroom units. The utilities trunk and the waste water holding tank each extend through each one of the plurality of restroom units.

In a second aspect of the invention, there is a portable restroom system that includes a pod structure including: a utilities trunk; a fresh water holding tank; a waste water holding tank; and a plurality of restroom units. The utilities trunk, the fresh water holding tank, and the waste water holding tank each are shared by each one of the plurality of restroom units. Each one of the plurality of restroom units comprises one of a standard toilet unit, a urinal unit, and an accessible toilet unit. Each one of the plurality of restroom units comprises at least one of a speaker, a light, and an air vent (e.g., fresh, heat, and/or air conditioning air vent) provided in a hole in a wall of the utilities trunk. Each one of the plurality of restroom units comprises a room defined by partitions, a ceiling, a floor, an external wall, and a door. Each one of the plurality of restroom units comprises one of: a toilet seat over a hole in a surface of the waste water holding tank, and a trough-style urinal that drains into the waste water holding tank.

In a third aspect of the invention, there is a method of manufacturing a portable restroom system. The method includes forming a unitary pod structure comprising a utilities trunk, a waste water holding tank, and a plurality of restroom units. The utilities trunk and the waste water holding tank each extend through each one of the plurality of restroom units.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention generally relates to portable restrooms and, more particularly, to portable structures containing plural restroom units. According to aspects of the invention, there is a multi-unit portable restroom pod structure that includes a plurality of individual restroom units that all share a common overhead utilities trunk and a common waste water holding tank. In embodiments, the pod structure is mounted on skids (instead of wheels) and is sized to fit within an industry standard 20' or 40' shipping container. In this manner, the pod structure may be transported inside a shipping container, on transport trailers, on roll-off and roll-back trucks, on water borne container carries, etc.

Figure 1:
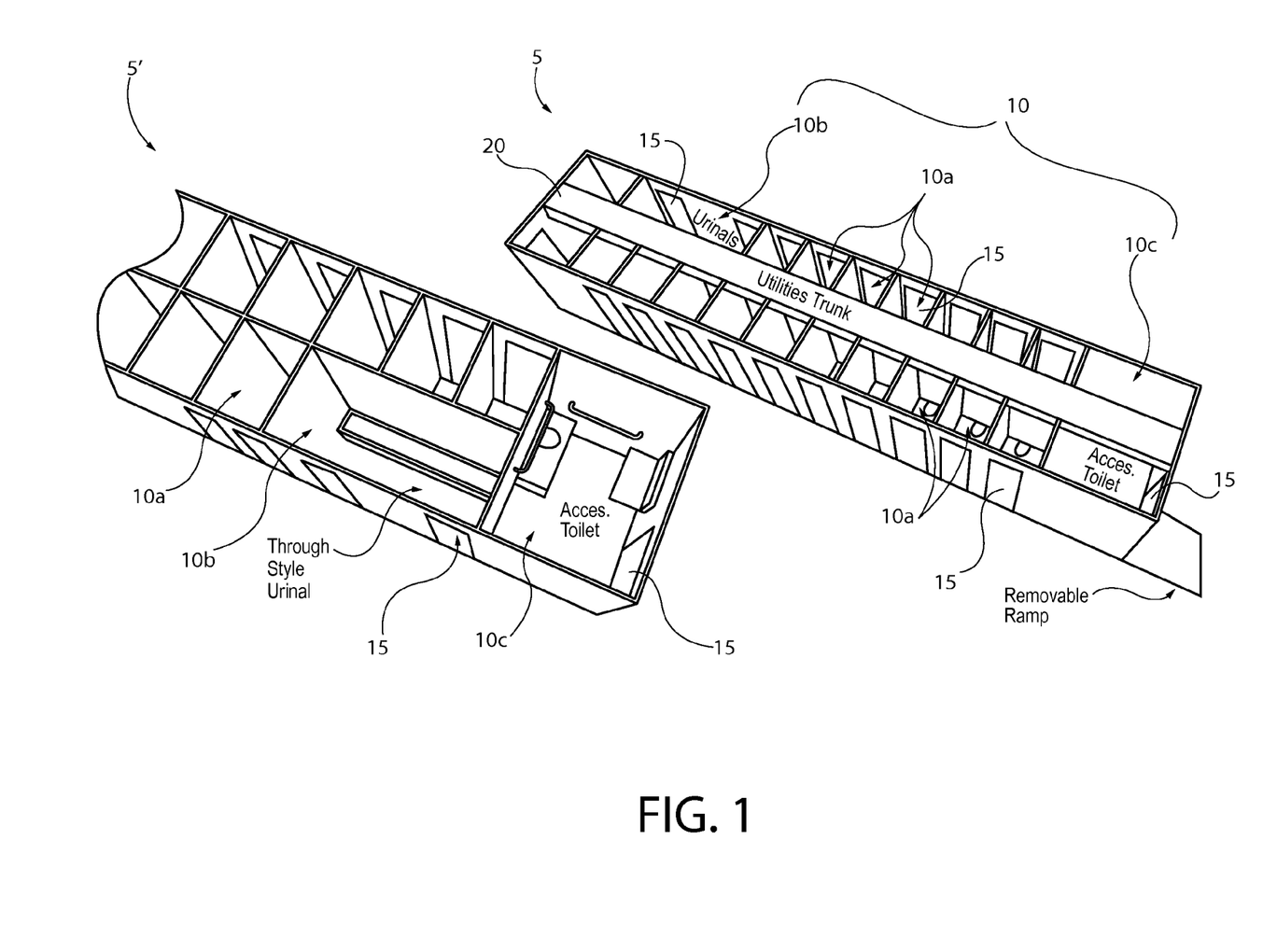
FIG. 1 depicts pod structures in accordance with aspects of the invention in accordance with aspects of the invention.

FIG. 1 shows a first pod structure 5 and a second pod structure 5' in accordance with aspects of the invention. In embodiments, the pod structures 5 and 5' include plural restroom units 10 connected in a single portable structure. The restroom units 10 may comprise any desired arrangement of, for example, standard toilet unit 10a, urinal unit 10b, and accessible toilet unit 10c. Each one of the units 10a, 10b, 10c may have a respective door 15 and a private room. Each of the units 10a and 10c may have a toilet in its respective room, whereas urinal unit 10b may have a urinal (e.g., trough) in its respective room. As depicted in pod structure 5, a single utilities trunk 20, which is described in greater detail herein, may be shared by all units 10.

Figure 2:
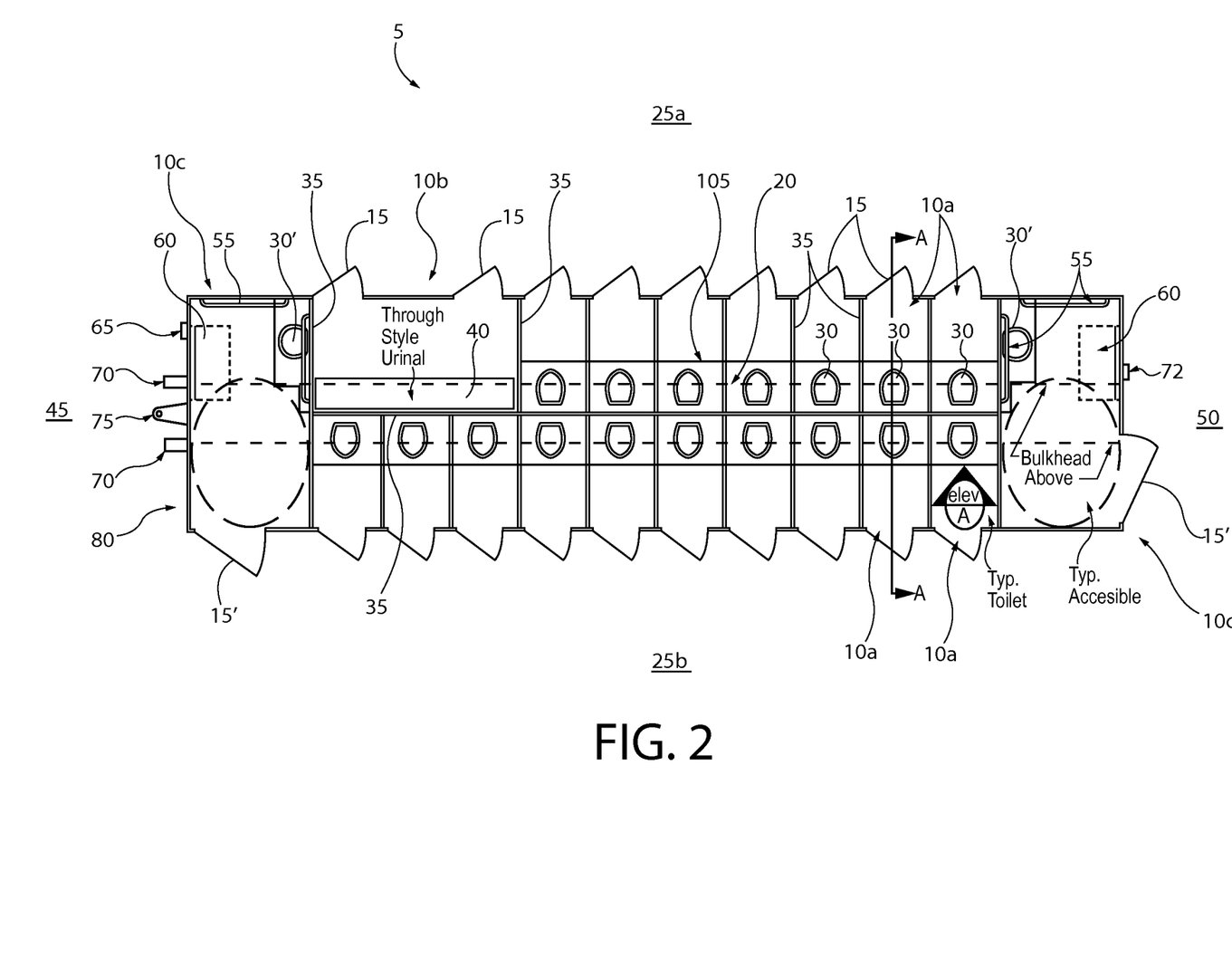
FIGS. 2-4 show plan views of exemplary pod structures in accordance with aspects of the invention.

FIG. 2 shows a plan view of an exemplary pod structure 5 in accordance with aspects of the invention. As depicted in FIG. 2, the pod structure 5 includes a plurality of standard toilet units 10a arranged adjacent to one another on a first lateral side 25a and a second lateral side 25b of the pod structure 5. Each of the standard toilet units 10a may be provided with a door 15 and a toilet 30. Partitions 35 may be provided between adjacent ones of the standard toilet units 10a to define a respective private room for each one of the standard toilet units 10a, with the door 15 providing access to the room from outside the pod structure 5.

Figure 3:
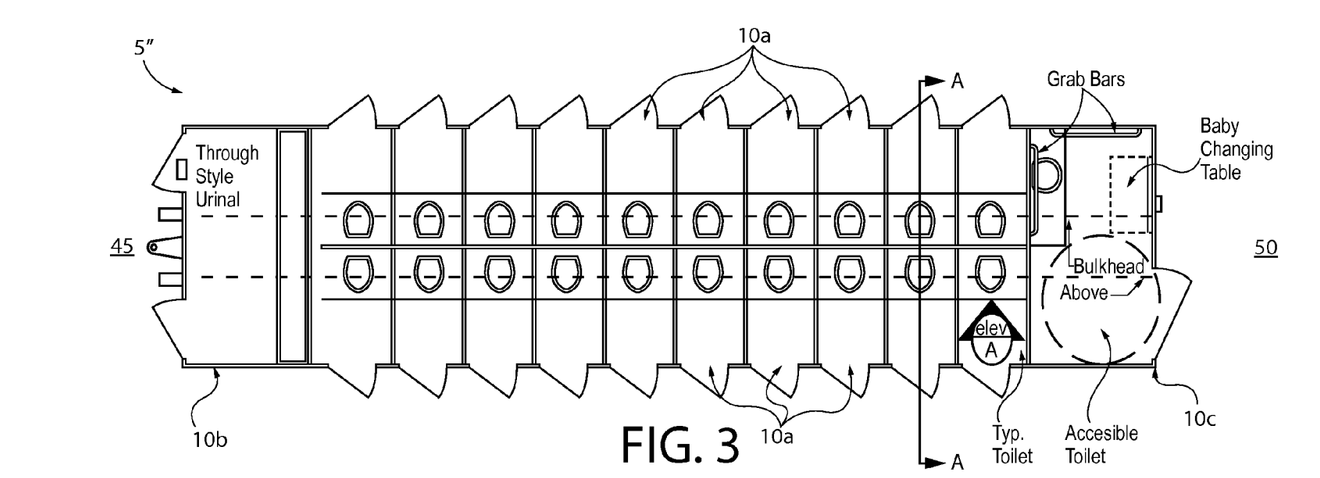

As further depicted in FIG. 2, the pod structure 5 may include a urinal unit 10b on one of the lateral sides, e.g., the first lateral side 25a. In embodiments, the urinal unit 10b is sized to correspond to a whole number multiple of the size of the standard toilet units 10a for providing modularity in design and construction of the pod structure 5. For example, as shown in FIG. 3, the urinal unit 10b has a size that corresponds to that of three of the standard toilet units 10a, although the invention is not limited to this size and any suitable size may be used. In embodiments, the urinal unit 10b includes a trough-style urinal 40 housed in a room defined by partitions 35, which room is provided with at least one door 15 for access from outside the pod structure 5.

Still referring to FIG. 2, the pod structure 5 may include an accessible toilet unit 10c at each of a front end 45 and a read end 50 of the pod structure 5. In embodiments, each accessible toilet unit 10c includes a room defined by partitions 35, a toilet 30' in the room, and a door 15' that provides ingress and egress from the room. The toilet 30' and door 15' may be sized to meet standards associated with accessible toilets. For example, the door 15' may be sized to permit passage by a wheelchair, and the toilet 30' may be a wheelchair-height toilet. Each accessible toilet unit 10c may also include other accessible toilet features, such as grab bars 55. Additionally, each accessible toilet unit 10c may include a baby changing table 60.

With continued reference to FIG. 2, the pod structure 5 may include a utilities trunk 20 that is shared by all units 10a-c. The pod structure 5 may also include a fill port 65 and a drain port 72 that are provided at opposite ends of a waste water holding tank 105 that is shared by all units 10a-c, and which is described in greater detail herein. The fill port 65 may be any desired water fill port, such as a standard hose connector, that permits a water hose to be connected to the waste water holding tank. The drain port 72 may be any desired water outlet port, such as a standard six inch sewer drain, that permits emptying of the waste water holding tank either by gravity or external suction.

As additionally shown in FIG. 2, the pod structure 5 may include roll-off rails 70 connected to the bottom of the pod structure 5 and extending longitudinally from the front end 45 to the rear end 50. In embodiments, the roll-off rails 70 are skids that are adapted to permit movement of the pod structure 5 by sliding on the rails 70, as is commonly seen with roll-off containers, dumpsters, etc. In embodiments, the roll-off rails 70 are sized and spaced apart from one another to conform to industry standards, such as 34 inch spacing, although any desired size and spacing may be used within the scope of the invention. The rails may be made of any suitable material, such as metal and/or plastic. The pod structure 5 may also be provided with a trailer hookup 75, such as a tongue, hook, or other structure that can receive a cable, hitch, or the like for pulling the pod structure 5. By using rails 70 as skids for sliding the pod structure 5, the pod structure 5 may be devoid of wheels and axles.

The pod structure 5 may also be provided with an electrical port 80, such as a standard 115 volt electrical outlet for connecting an electrical cord to the pod structure 5 for supplying electrical power to various accessories contained in the pod structure 5.

The pod structure 5 shown in FIG. 2 may be provided with an overall length of slightly less than forty feet from the front end 45 to the rear end 50. In this manner, the pod structure 5 may fit within a standard forty foot shipping container with only an inch or two of clearance between the front end 45 and the interior of the shipping container and the rear end 50 and the interior of the shipping container. The invention is not limited to a roughly forty foot length, however, and any suitable length may be used, such as ten foot, twenty foot, etc. Similarly, in exemplary implementations, the pod structure has an overall height (e.g., from the bottom of the rails 70 to the top of the HVAC unit and/or fresh water holding tank) is sized to fit within a standard forty foot shipping container with only an inch or two of clearance.

Figure 4:
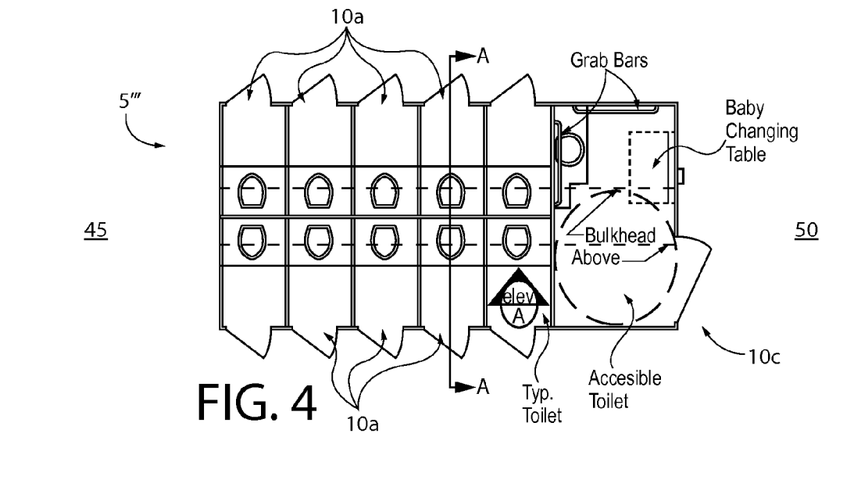

The invention is not limited to the exemplary arrangement of units 10a-c shown in FIG. 2, and any desired arrangement of units 10a-c may be used within the scope of the invention. For example, FIG. 3 shows an implementation of a pod structure 5" comprising units 10a-c similar to pod structure 5, but wherein the urinal unit 10b is provided at the front end 45 instead of along one of the lateral sides. As another example, FIG. 4 shows a pod structure 5''' comprising units 10a and 10c but without a urinal unit 10b. The pod structure 5''' shown in FIG. 4 may be provided with an overall length of slightly less than 20 feet from the front end 45 to the rear end 50. In this manner, the pod structure 5''' may fit within a standard twenty foot shipping container with only an inch or two of clearance between the front end 45 and the interior of the shipping container and the rear end 50 and the interior of the shipping container. As should be apparent to one of skill in the art, any desired arrangement of units 10a/10b/10c may be used in a pod structure within the scope of the invention.

Figure 5A:
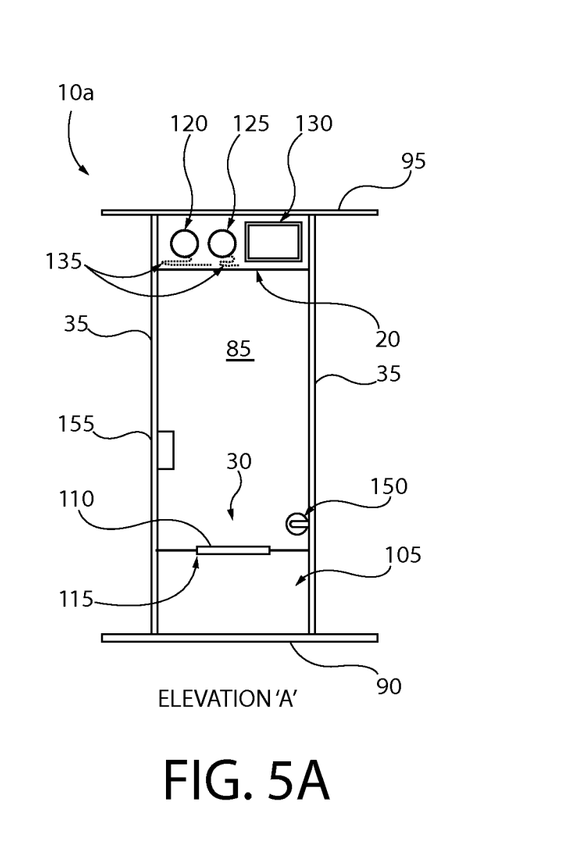
FIG. 5A shows an elevation view of an interior of a standard toilet unit that may be included in a pod structure in accordance with aspects of the invention.
Figure 5B:
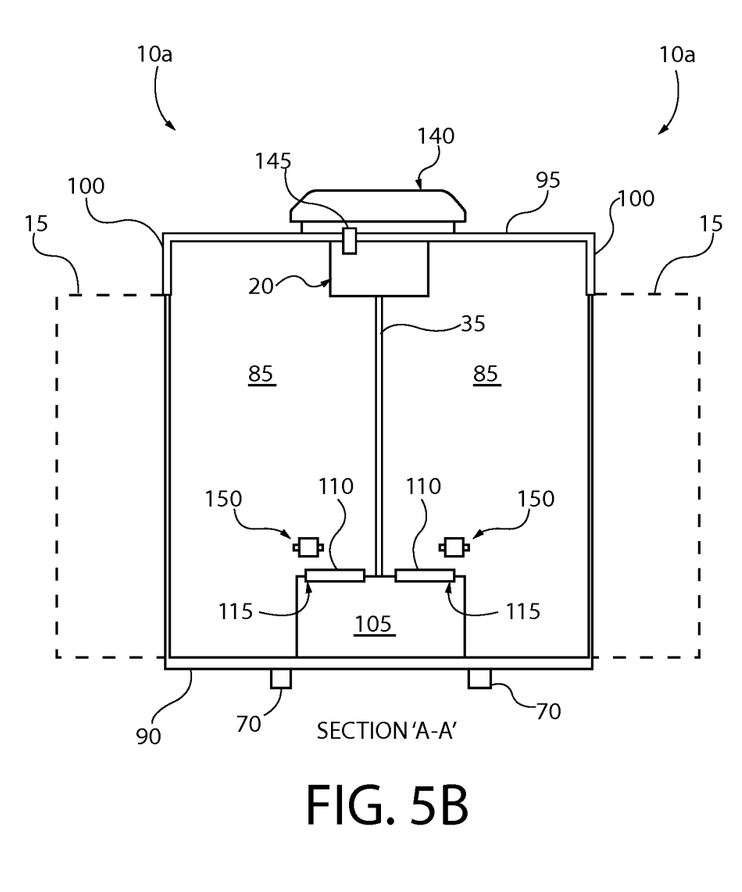
FIG. 5B shows a cross section of a pod structure showing two adjacent standard toilet units in accordance with aspects of the invention.

FIG. 5A shows an elevation view of an interior of a standard toilet unit 10a that may be included in a pod structure 5 in accordance with aspects of the invention. FIG. 5B shows a cross section of a pod structure 5 taken along line A-A of FIG. 2, and shows two adjacent standard toilet units 10a in accordance with aspects of the invention. The features of FIGS. 5A and 5B are described with respect to a standard toilet unit 10a, but can also be used with the urinal unit 10b and/or accessible toilet unit 10c.

As depicted in FIGS. 5A and 5B, each standard toilet unit 10a includes a room 85 defined by partitions 35, a floor 90, a ceiling 95, an exterior wall 100, and a door 15. In embodiments, each standard toilet unit 10a includes a toilet 30 connected to a common waste water holding tank 105. The toilet 30 may include a conventional toilet seat 110 provided over a hole 115 in an upper surface of the waste water holding tank 105. In this manner, a single waste water holding tank 105 collects waste from all the respective standard toilet units 10a. As seen in FIGS. 5A and 5B, the partitions 35 may be formed around the waste water holding tank 105.

In embodiments, the waste water holding tank 105 comprises a hollow structure defined by walls and that runs along a length of the pod structure 5, the length and shape of the waste water holding tank 105 being sufficient to cause the waste water holding tank 105 to spatially overlap (e.g., extend through) all of the units 10a-c in the pod structure 5. In standard toilet units 10a and accessible toilet units 10c, a toilet seat may be provided over a hole in a top surface of the waste water holding tank 105. In urinal units 10b, the trough style urinal 40 may be placed on a top surface of the waste water holding tank 105 with a hole or other plumbing providing a flow path from the trough style urinal 40 to the interior of the waste water holding tank 105. In this manner, the single waste water holding tank 105 extends through and collects waste from all the units 10a-c in the pod structure 5.

In embodiments, the fill port 65 is operatively connected (e.g., plumbed) to a first end of the waste water holding tank 105, and the drain port 72 is operatively connected (e.g., plumbed) to a second end of the waste water holding tank 105. In this manner, fresh water may be provided to the waste water holding tank 105 via the fill port 65, and liquid and/or solid waste may be removed from the waste water holding tank 105 via the drain port 72. In embodiments, the emptying of the waste water holding tank 105 is performed using gravity and/or external suction (e.g., from a servicing truck), such that the pod structure 5 is devoid of pumps for moving waste within the waste water holding tank 105. Also, because showers are not provided, the pod structure 5 may be devoid of water pumps altogether since no running water is provided other than gravity-fed hand washing sinks as described herein.

Still referring to FIGS. 5A and 5B, the utilities trunk 20 comprises a hollow structure defined by walls and that runs along a length of the pod structure 5, the length and shape of the utilities trunk 20 being sufficient to extend through all of the units 10a-c in the pod structure 5. As depicted in FIGS. 5A and 5B, each standard toilet unit 10a may include at least one of a music speaker 120, a light 125, and a vent 130 provided in one or more holes in a wall of the utilities trunk 20. Electrical wiring 135 of the music speaker 120 and/or light 125 may be run inside the hollow space defined by the interior of the utilities trunk 20 to respective sources (e.g., sound source for speakers, electricity source for lights, etc.). The wiring of the lights 125 may be connected to a power supply that receives power from the electrical port 80. The wiring of the speakers may be connected to a music source, such as a radio, CD player, etc.

In embodiments, the hollow space defined by the interior of the utilities trunk 20 defines a flow path for providing heating, ventilation, or cooling (HVAC) air to the respective vent 130 in each unit. For example, a recreational vehicle (RV) style roof mounted HVAC unit 140 may be provided on the pod structure 5 (e.g., on the exterior of the ceiling 95), with an outlet of the HVAC unit 140 operatively connected (e.g., plumbed) to the interior of the utilities trunk 20, e.g., via conduit 145. In this manner, each one of the units 10a-c may be provided with heating, ventilation, or cooling air via the vent 130. In this manner, a single utilities trunk 20 provides HVAC air for all of the respective units 10a-c. Similarly, the single utilities trunk 20 provides a wiring conduit for the speaker 120 and/or light 125 for all of the respective units 10a-c.

Still referring to FIGS. 5A and 5B, each of the units 10a may be provided with at least one of a toilet paper dispenser 150, a hand sanitizer dispenser 155, and a vanity mirror. Also, as shown in FIG. 5B, the rails 70 may be connected to the exterior of the floor 90 using any suitable mechanical fastening system, such as bolts or the like.

In accordance with aspects of the invention, the partitions 35, floor 90, ceiling 95, exterior walls 100, doors 15, utilities trunk 20, and waste water holding tank 105 are all formed of plastic. For example, the entire pod structure 5 including plural units 10a-c (e.g., including the partitions 35, floor 90, ceiling 95, exterior walls 100, doors 15, utilities trunk 20, and waste water holding tank 105) may be made as a unitary/unibody plastic structure by molding, such as rotational molding, blow molding, thermoforming, injection molding, etc. The plastic may be any suitable plastic, such as polypropylene, acrylic, fiber glass, etc. Alternatively, various portions of the pod structure 5 may be separately formed and then permanently fused together, e.g., using plastic welding or the like.

In accordance with aspects of the invention, the pod structure may be manufactured according to a design provided by a customer. For example, the customer may design a pod structure by arranging modules of the standard toilet unit 10a, urinal unit 10b, and accessible toilet unit 10c within an overall dimensional footprint of the pod structure. A manufacturer may then fabricate the pod structure as a unitary, molded plastic structure according to the customer design. This permits each customer to customize how many of each unit 10a-c to include in a pod structure, and how to spatially arrange (e.g., layout) the units 10a-c in the pod structure.

Figure 6A:
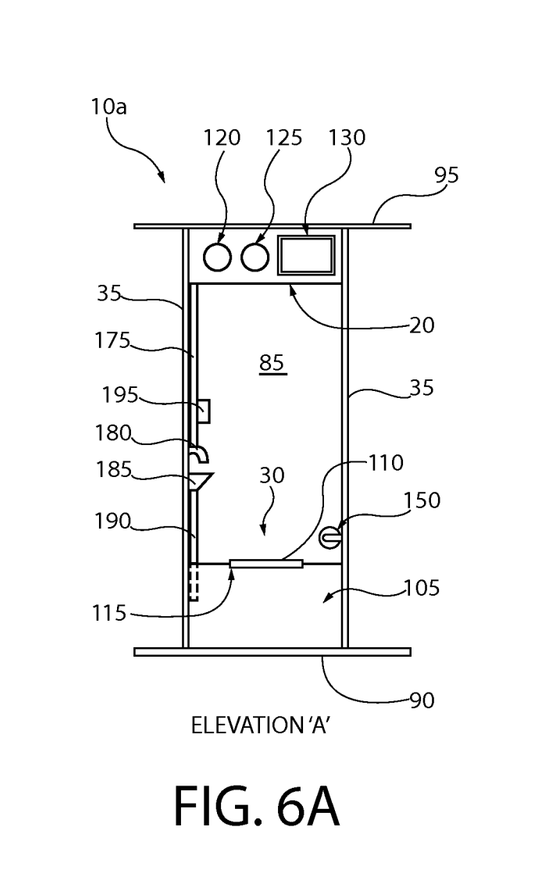
FIG. 6A shows an elevation view of an interior of a standard toilet unit that may be included in a pod structure in accordance with aspects of the invention.
Figure 6B:
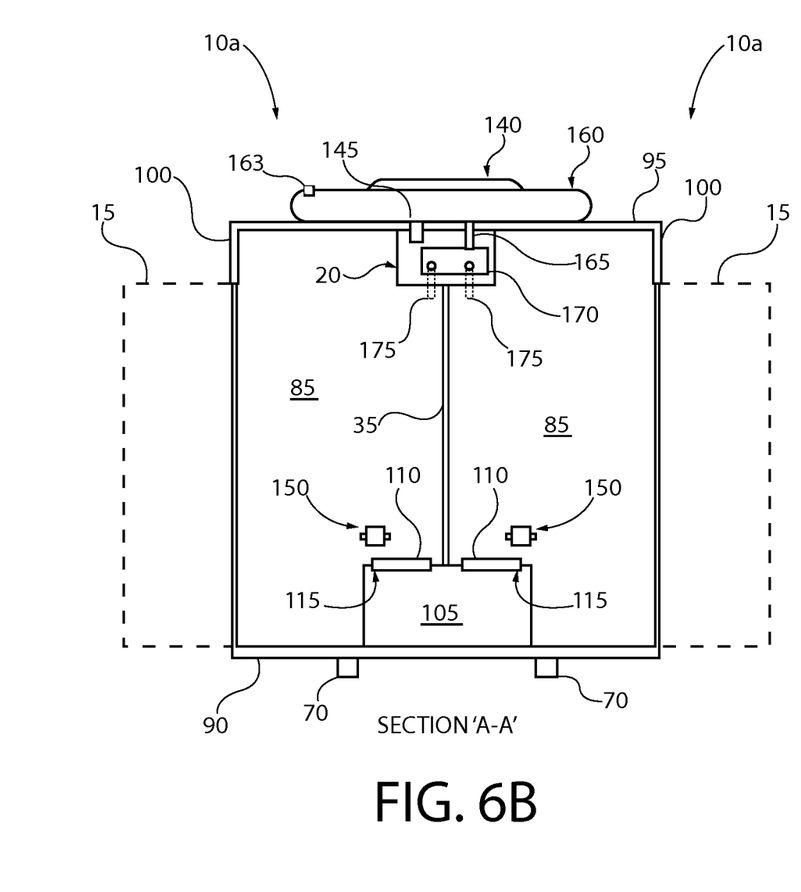
FIG. 6B shows a cross section of a pod structure showing two adjacent standard toilet units in accordance with aspects of the invention.

FIGS. 6A and 6B show an exemplary implementation of aspects of the invention in which like reference numbers refer to elements as already described with respect to FIGS. 5A and 5B. In embodiments, a fresh water holding tank 160 is provided on the pod structure 5 (e.g., on the exterior of the ceiling 95). The fresh water holding tank 160 may have an inlet port 163 adapted for filing the fresh water holding tank 160 with a hose, e.g., a standard garden hose, etc. In embodiments, at least one conduit 165 extends from the fresh water holding tank 160 to a manifold 170 inside the utilities trunk 20. The manifold 170 is connected to a respective conduit 175 in each of the respective units 10a-c. In embodiments, each unit 10a-c is provided with a faucet 180 connected to the conduit 175, a sink 185 below the faucet 180, and a drain conduit 190 connected to the sink 185 and extending down into the interior of the waste water holding tank 105. The conduits 165, 175, and 190 may be flexible hose or rigid pipe or any other conduit suitable for transporting water. In embodiments, the conduits 175 and 190 and the sink 185 are attached to one of the partitions 35 that forms a wall of the unit 10a-c. In embodiments, the fresh water holding tank 160 is no higher than the HVAC unit 140 above the roof of the pod structure 5.

In this manner, each respective unit 10a-c may be provided with a hand-washing station to which fresh water is delivered by gravity (e.g., gravity-fed) from the fresh water holding tank 160 via the conduit 165, manifold 170, conduit 175, and faucet 180. The water used at the hand-washing station is collected and removed from the respective unit 10a-c via the sink 185, drain conduit 190, and waste water holding tank 105, all by gravity feed. In this manner, one or more fresh water holding tanks 160 and the single waste water holding tank 105 may be used to provide hand-washing water to each one of the plurality of units 10a-c without the use of water pumps. Each unit 10a-c may also be provided with a soap dispenser 195 that supplies soap for the hand washing station and a hand towel dispenser for hand drying.

Figure 7:
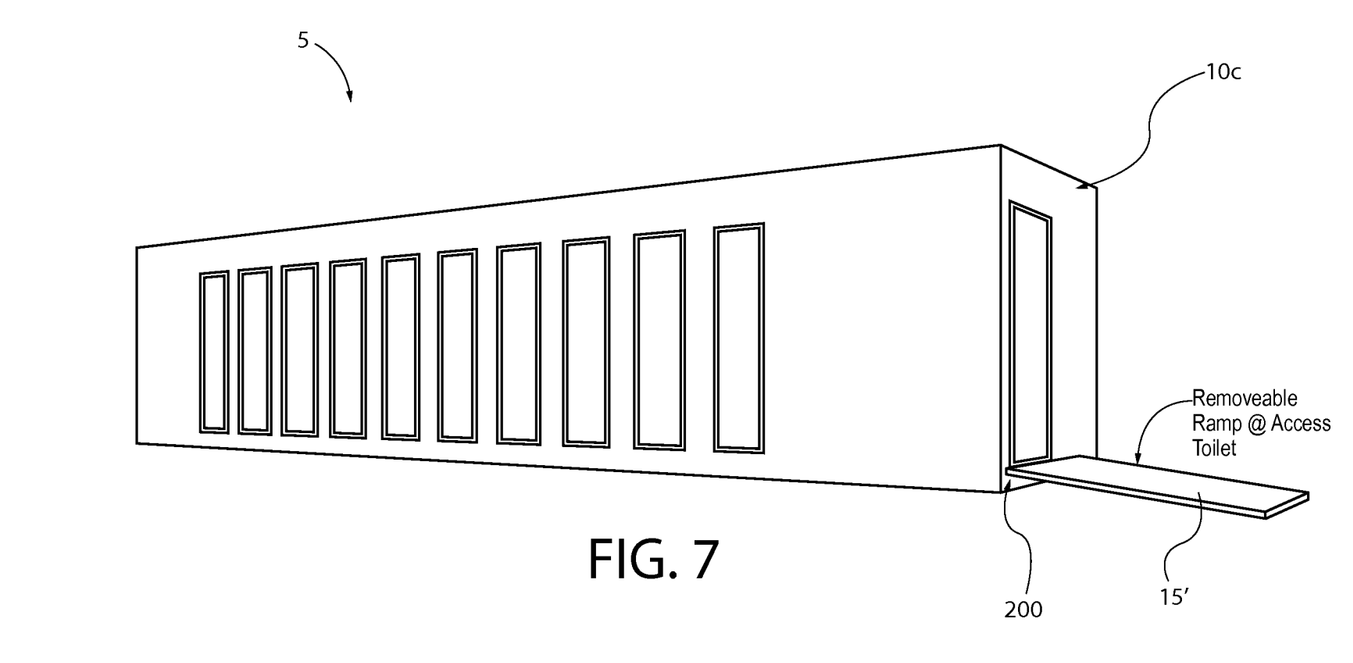
FIGS. 7 and 8 show aspects of an accessible toilet unit in a pod structure in accordance with aspects of the invention.
Figure 8:
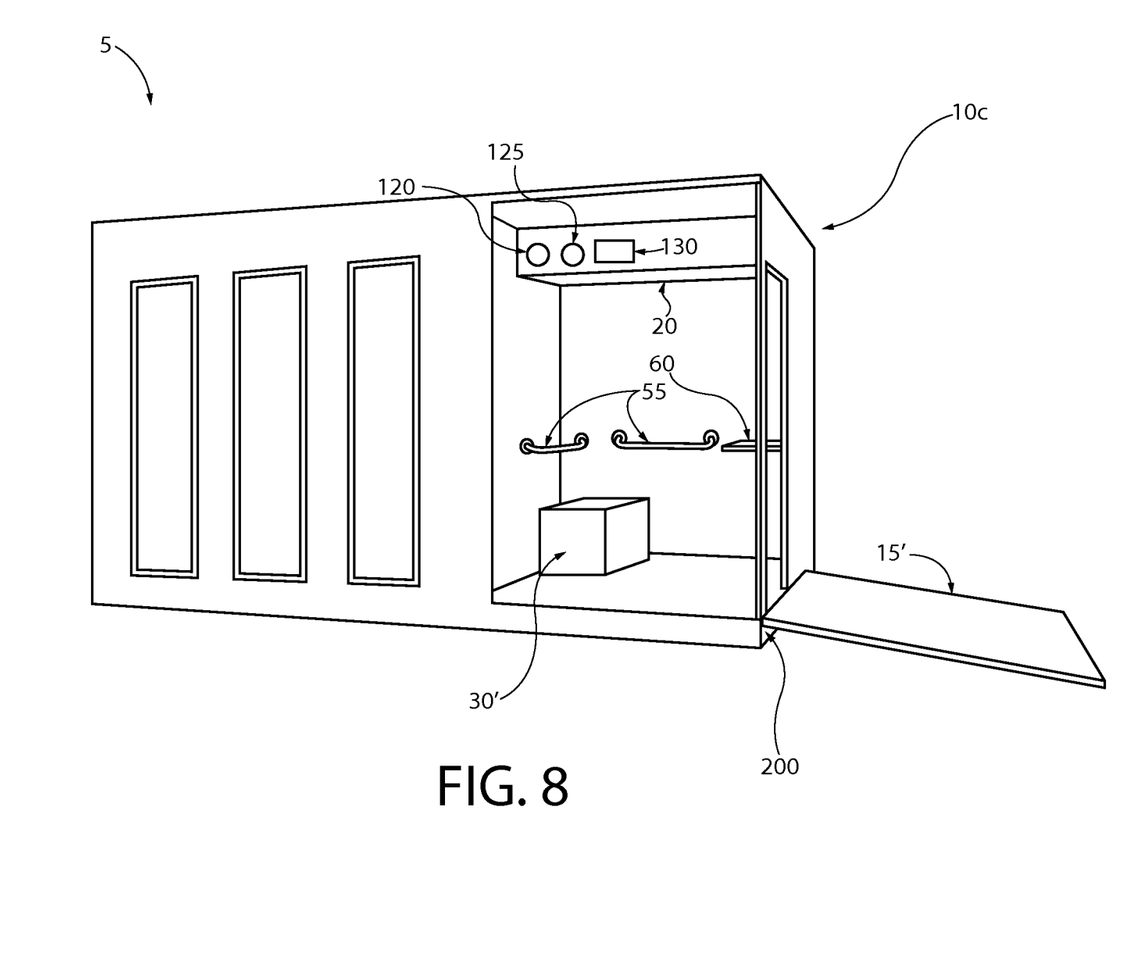

FIGS. 7 and 8 show aspects of an accessible toilet unit 10c in a pod structure 5 in accordance with aspects of the invention. In embodiments, the accessible toilet unit 10c includes an accessible toilet 30', grab bars 55, and a baby changing table 60. The accessible toilet unit 10c may also include at least one of a music speaker 120, a light 125, and a vent 130 provided in one or more holes in a wall of the utilities trunk 20. The accessible toilet unit 10c may also include a gravity-fed hand washing station including a sink 185 and associated faucet and drain conduit as previously described with respect to FIGS. 5B and 6B. In embodiments, the door 15' comprises a panel that is selectively positionable as a ramp to provide wheelchair access into the accessible toilet unit 10c. In the ramp position, at least one hook 200 in the door 15' is mated in a slot in the pod structure 5 to secure the door 15' relative to the pod structure 5. When not used as a ramp, the door 15' may be stowed inside the room defined by the accessible toilet unit 10c.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A portable restroom system, comprising:
   a utilities trunk;
   a waste water holding tank; and
   a plurality of restroom units each comprising a room defined by vertical partitions, a ceiling, a floor, an external wall, and an exterior door, wherein:
   the utilities trunk and the waste water holding tank each extend into and through each room of the plurality of restroom units,
   the utilities trunk extends downward from the ceiling of each room of the plurality of restroom units, and
   the waste water holding tank defines a continuous volume that straddles one of the vertical partitions between adjacent ones of the rooms at a location that is elevationally higher than the floors of the adjacent ones of the rooms.

2. The portable restroom system of claim 1, wherein each one of the plurality of restroom units comprises one of a standard toilet unit, a urinal unit, and a handicap-accessible toilet unit.

3. The portable restroom system of claim 2, wherein each one of the plurality of restroom units comprises at least one of a speaker, a light, and an air vent provided in a hole in a vertical wall of the utilities trunk below the ceiling of the room.

4. The portable restroom system of claim 3, further comprising a heating/ventilation/air-conditioning unit operatively connected to an interior volume defined by the utilities trunk and configured to provide heating/ventilation/cooling air to each one of the plurality of restroom units via the utilities trunk.

5. The portable restroom system of claim 3, further comprising wiring connected to at least one of the speaker and the light routed inside the utilities trunk.

6. The portable restroom system of claim 1, wherein at least one of the plurality of restroom units comprises a standard toilet unit comprising:
   a toilet seat aligned over a hole in a top surface of the waste water holding tank, wherein the top surface of the waste water holding tank is elevationally higher than the floor of the room of the at least one of the plurality of restroom units, and wherein the floor of the room of the at least one of the plurality of restroom units is at a same height as a bottom surface of the waste water holding tank.

7. The portable restroom system of claim 6, wherein the standard toilet unit further comprises at least one of: a toilet paper dispenser, a hand sanitizer dispenser, a gravity-fed hand-washing sink, and a mirror.

8. The portable restroom system of claim 1, wherein at least one of the plurality of restroom units comprises a handicap-accessible toilet unit comprising:
   a handicap-accessible toilet comprising a toilet seat aligned over a hole in a surface of the waste water holding tank.

9. The portable restroom system of claim 8, wherein the a handicap-accessible toilet unit further comprises at least one of: a grab bar, a baby changing station, a toilet paper dispenser, a hand sanitizer dispenser, a gravity-fed hand-washing sink, and a mirror.

10. The portable restroom system of claim 1, wherein at least one of the plurality of restroom units comprises urinal unit comprising:
    a trough-style urinal that drains into the waste water holding tank.

11. The portable restroom system of claim 10, wherein the urinal unit further comprises at least one of: a hand sanitizer dispenser, a gravity-fed hand-washing sink, and a mirror.

12. The portable restroom system of claim 1, further comprising:
    a fill port connected at a first end of the waste water holding tank; and
    a drain port connected to the waste water holding tank at either the first end or at a second end opposite the first end.

13. The portable restroom system of claim 1, wherein the utilities trunk, the waste water holding tank, and the plurality of restroom units are contained in a unitary pod structure, and wherein the unitary pod structure has an overall length and an overall height that are sized to fit within a twenty or forty foot shipping container.

14. The portable restroom system of claim 13, further comprising roll-off rails on a bottom of the pod structure configured for skidding the pod structure onto and off of a roll-off or roll-back vehicle, such that the pod structure is devoid of wheels for movement.

15. The portable restroom system of claim 14, further comprising a cable hook at one end of the pod structure.

16. The portable restroom system of claim 13, wherein the pod structure is devoid of water pumps.

17. The portable restroom system of claim 1, wherein the plurality of restroom units comprises:
    a first plurality of standard toilet units on a first lateral side of a pod structure;
    a second plurality of standard toilet units on a second lateral side of the pod structure;
    at least one handicap-accessible toilet unit at at least one of a front end and a rear end of the pod structure; and
    at least one urinal unit on at least one of the first lateral side, the second lateral side, the front end, and the rear end,
    wherein an interior partition extending in a lengthwise direction between the front end and the rear end defines a vertical wall of the respective room of each of the first plurality of standard toilet units and each of the second plurality of standard units, and wherein the continuous volume defined by the waste water holding tank straddles the interior partition.

18. A portable restroom system, comprising:
    a pod structure comprising: a utilities trunk; a fresh water holding tank; a waste water holding tank; and a plurality of restroom units, wherein:
    the utilities trunk, the fresh water holding tank, and the waste water holding tank each are shared by each one of the plurality of restroom units;
    each one of the plurality of restroom units comprises one of a standard toilet unit, a urinal unit, and a handicap-accessible toilet unit;
    each one of the plurality of restroom units comprises at least one of a speaker, a light, and an air vent provided in a hole in a wall of the utilities trunk;

each one of the plurality of restroom units comprises a room defined by partitions, a ceiling, a floor, an external wall, and a door;

each one of the plurality of restroom units comprises one of: a toilet seat over a hole in a surface of the waste water holding tank, and a trough-style urinal that drains into the waste water holding tank, the waste water holding tank comprises a first hollow structure that extends into and through each room of the plurality of restroom units, wherein the waste water holding tank defines a continuous volume that: (i) extends upward from the floor defining each room, and (ii) straddles a vertical partition between a first one of the standard toilet units and a second one of the standard toilet units; and the utilities trunk comprises a second hollow structure that extends into and through each room of the plurality of restroom units, wherein the utilities trunk extends downward from the ceiling defining each room.

19. The portable restroom system of claim 18, further comprising:

a fill port connected at a first end of the waste water holding tank;

a drain port connected at a second end of the waste water holding tank opposite the first end;

roll-off rails on a bottom of the pod structure configured for skidding the pod structure onto and off of a roll-off or roll-back vehicle; and a cable hook at one end of the pod structure.

20. A method of manufacturing a portable restroom system, comprising:

forming a unitary pod structure comprising a utilities trunk, a waste water holding tank, and a plurality of restroom units each comprising a room defined by vertical partitions, a ceiling, a floor, an external wall, and an exterior door, wherein:

the utilities trunk and the waste water holding tank each extend into and through each room of the plurality of restroom units, the waste water holding tank defines a continuous volume that straddles one of the vertical partitions between adjacent ones of the rooms at a location that is elevationally higher than the floors of the adjacent ones of the rooms, the pod structure comprises roll-off rails on a bottom of the pod structure configured for skidding the pod structure onto and off of a roll-off or roll-back vehicle, and the pod structure comprises a cable hook at one end of the pod structure.

* * * * *